United States Patent [19]

Tokuyama et al.

[11] Patent Number: 4,845,740
[45] Date of Patent: Jul. 4, 1989

[54] RADIOTELEPHONE SYSTEM ADAPTED TO READ A CREDIT CARD

[75] Inventors: Katsumi Tokuyama; Kanji Arai; Takuji Ishikawa; Haruhiko Akiyama, all of Tokyo, Japan

[73] Assignee: Oki Electric Industry Co., Ltd., Tokyo, Japan

[21] Appl. No.: 279,786

[22] Filed: Dec. 5, 1988

Related U.S. Application Data

[63] Continuation of Ser. No. 895,485, Aug. 11, 1986, abandoned.

[30] Foreign Application Priority Data

Aug. 12, 1985 [JP] Japan ................................. 60-175766
Aug. 12, 1985 [JP] Japan ................................. 60-175767

[51] Int. Cl.$^4$ ............................................. H04M 1/57
[52] U.S. Cl. ...................................... 379/91; 379/144; 235/380
[58] Field of Search ................... 379/144, 91; 235/380, 235/381

[56] References Cited

U.S. PATENT DOCUMENTS

| | | | |
|---|---|---|---|
| 4,399,330 | 8/1983 | Kuenzel | 379/58 |
| 4,439,636 | 3/1984 | Newkirk et al. | 379/91 |
| 4,640,986 | 2/1987 | Yotsutani et al. | 379/60 |
| 4,756,020 | 7/1988 | Fodale | 379/112 |
| 4,759,056 | 7/1988 | Akiyama | 379/197 |
| 4,763,191 | 8/1988 | Gordon et al. | 358/86 |

FOREIGN PATENT DOCUMENTS

| | | |
|---|---|---|
| 0088639 | 9/1983 | European Pat. Off. . |
| WO84/01073 | 3/1984 | PCT Int'l Appl. . |
| WO86/03915 | 7/1986 | PCT Int'l Appl. . |
| 1565445 | 4/1980 | United Kingdom . |
| 2105149 | 3/1983 | United Kingdom . |

OTHER PUBLICATIONS

Turbat, A., "Telepayment and Electronic Money, the Smart Card", *Computation & Transmission*, No. 5, 12/82, pp. 11–20.

Demeautis, M. et al., "The TV 200, A Transactional Telephone", *Commutation & Transmission*, No. 1, 1/85, pp. 71–82.

Weinstein, S., "Smart Credit Cards: The Answer to Cashless Shopping", *I.E.E.E. Spectrum*, 2/84, pp. 43–49.

M. DeMeautis et al., "The T.V. 200-A Transactional Telephone", *Commutation & Transaction*, 4/85, pp. 71–82.

S. B. Weinstein, "Smart Credit Cards: The Answer to Cashless Shopping", *IEEE Spectrum*, 2/84, pp. 43–49.

*Primary Examiner*—Robert Lev
*Attorney, Agent, or Firm*—Wenderoth, Lind & Ponack

[57] ABSTRACT

A radio phone equipment for credit card is adapted to transfer part or a whole of credit card or charge card information read by a card reader as well as a dial number dialed by a key pad to a mobile telecommunication switching office by means of a modem and a transmitter/receiver, and in case of said credit card or charge card being valid, switching, on the basis of a designation on a voice channel transmitted from said mobile telecommunication switching office, or transmitting and receiving frequency to said voice channel to construct a speech channel, and furthermore detecting on-hook of a handset produced upon finishing talking to reset the equipment.

4 Claims, 8 Drawing Sheets

Fig. 4

| DECIMAL | CARD NUMBER ENCORDING BIT POSITION | | | | | TRANSMISSION NUMBER ENCORDING BIT POSITION | | | |
|---|---|---|---|---|---|---|---|---|---|
| | P | 8 | 4 | 2 | 1 | 8 | 4 | 2 | 1 |
| 0 | 1 | 0 | 0 | 0 | 0 | 1 | 0 | 1 | 0 |
| 1 | 0 | 0 | 0 | 0 | 1 | 0 | 0 | 0 | 1 |
| 2 | 0 | 0 | 0 | 1 | 0 | 0 | 0 | 1 | 0 |
| 3 | 1 | 0 | 0 | 1 | 1 | 0 | 0 | 1 | 1 |
| 4 | 0 | 0 | 1 | 0 | 0 | 0 | 1 | 0 | 0 |
| 5 | 1 | 0 | 1 | 0 | 1 | 0 | 1 | 0 | 1 |
| 6 | 1 | 0 | 1 | 1 | 0 | 0 | 1 | 1 | 0 |
| 7 | 0 | 0 | 1 | 1 | 1 | 0 | 1 | 1 | 1 |
| 8 | 0 | 1 | 0 | 0 | 0 | 1 | 0 | 0 | 0 |
| 9 | 0 | 1 | 0 | 0 | 1 | 1 | 0 | 0 | 1 |
| NULL | NOT EXIST | | | | | 0 | 0 | 0 | 0 |

NOTE--- NULL IS EMPLOYED TO PERMIT FIGURES OF THE PRIMARY ACCESS NUMBERS TO COINCIDE WITH EACH OTHER

Fig. 6

WARD F

| F=0 | NAWC | D$_1$ | D$_2$ | D$_3$ | D$_4$ | D$_5$ | D$_6$ | D$_7$ | D$_8$ | P |
|---|---|---|---|---|---|---|---|---|---|---|
| 1 | 3 | 4 | 4 | 4 | 4 | 4 | 4 | 4 | 4 | 12 |

WARD G

| F=0 | NAWC 000 | D$_9$ | D$_{10}$ | D$_{11}$ | D$_{12}$ | D$_{13}$ | D$_{14}$ | D$_{15}$ | D$_{16}$ | P |
|---|---|---|---|---|---|---|---|---|---|---|
| 1 | 3 | 4 | 4 | 4 | 4 | 4 | 4 | 4 | 4 | 12 |

RADIOTELEPHONE SYSTEM ADAPTED TO READ A CREDIT CARD

This application is a continuation, of now abandoned application Ser. No. 895,485, filed Aug. 11, 1986 now abandoned.

BACKGROUND OF THE INVENTION

1. Field of the Invention

The present invention relates to a radio phone equipment, and more particularly to a radio phone apparatus for credit card for making a telephone call by the use of a credit card or a charge card.

2. Description of the Related Art

Progress of mobile phone services in recent years demands a mobile phone with which passengers taking an omnibus, a sightseeing bus, and a taxi, etc., can freely give a telephone call. Prior techniques in such a field are known in for example "Design of Car Equipment for Mobile Public Phone" issued by Electric & Communication Laboratory of NTT, vol. 33, No. 4 1984, p.p. 771 to 783 (1984) or in "Versatile Services of Mobile Phone" Telecommunication Facilities, vol. 36, No. 8, p.p. 115 to 118 (1984) in NTT Facility Division.

A mobile phone described in these references is that of coin dispensing public type wherein the charges for telephone calls are selectively collected without fail without troubling a carman when the phone is employed by passengers taking an omnibus, a sight-seeing bus, and a taxi, etc.

However, such a coin dispensing system suffers from the following problems:

(a) A user must have a proper amount of coins with him.

(b) Processing for charging as a coin type mobile phone is needed to result in a complicated circuit therefor as well as deteriorated speech quality. Moreover, a strong box to house coins is needed. Thus, the mobile is heavy-weighted and is costly.

(c) Usage of the mobile phone must be limited depending on a capacity of the strong box when the box is full with coins and hence coins must be withdrawn periodically.

SUMMARY OF THE INVENTION

In view of the drawbacks of the prior radio phone, it is an object of the present invention to provide a radio phone equipment for use in credit cards being connectable with a public radio phone hereto without use of a coin and without troubling a carman of a sight-seeing automobile, etc. telecommunication switching office via the transmitter/receiver unit and the modem and instructing the transmitter/receiver unit.

To achieve the above-noted object, a radiotelephone system adapted to read a credit card for charging in accordance with the present invention includes:

a reader for inputting a credit card information signal stored on the credit card which includes a card expiration date signal and a primary access number signal;

a clock circuit generator for generating a present date signal;

a comparator for comparing the expiration date signal with the present date signal; and a transmitter for transmitting the credit card information signal with the card expiration date signal deleted only if a date indicated by the present date signal is prior to or equal to a date indicated by the card expiration date signal.

The above noted radiotelephone system in accordance with the present invention may also utilize a radio control data link for transmitting the credit card information signal.

Furthermore, in the above-noted radiotelephone system, the credit card information signal including at least the primary access number signal may be transmitted over a voice channel.

Still furthermore, the above-noted radiotelephone system in accordance with the present invention may further include a visible indicator or an audible indicator for indicating the comparison effected by the comparator.

The above and other objects, features and advantages of the present invention will become more apparent from the following description when taken in conjunction with the accompanying drawings in which a preferred embodiment of the present invention is shown by way of an illustrative example. An embodiment as disclosed herewith is an example. Means, apparatus, device, etc. employing other embodiments are easily replaceiable with equivalent thereof.

BRIEF DESCRIPTION OF THE DRAWINGS

FIG. 4 is a view exemplarily showing a relationship between a recording format of a priamry access number recorded on a credit card and a format thereof in transferring it via a radio channel;

FIG. 6 is a view illustrating in part a view indicative of a 32-figures transmission data format of a USA EIA standard system.

DETAILED DESCRIPTION OF THE PREFERRED EMBODIMENT

Figure 1:
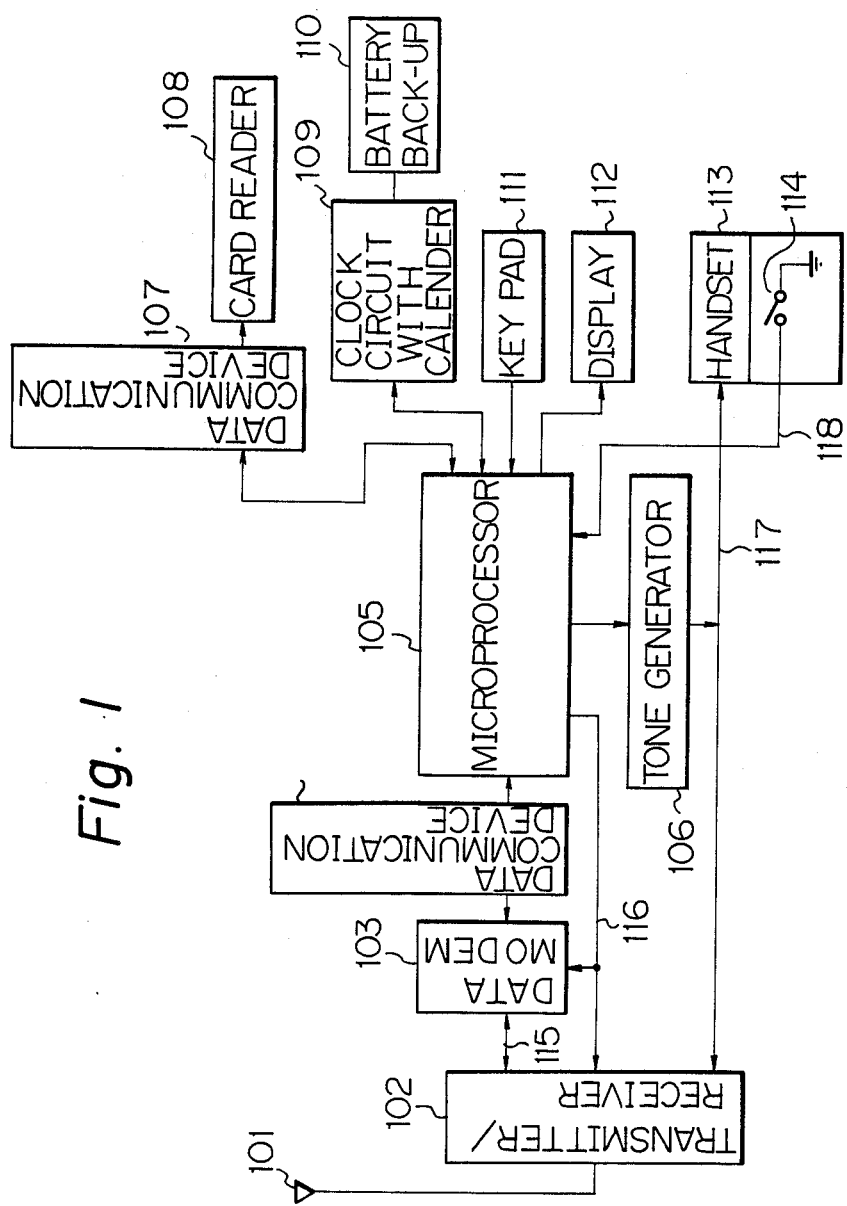
FIG. 1 is a block diagram illustrating an embodiment of a radio phone equipment for use in a credit card according to the present invention.

Referring to FIG. 1 illustrating a radio phone equipment for a credit card according to the present invention, arrangement of the equipment will be described.

As shown in FIG. 1, designated at 101 is an antenna, and 102 is a transmitter/receiver having a function of modulating a radio frequency signal with a voice signal delivered from a handset 113 and data provided from a data modem 103 and transferring it to the antenna 101 as well as a function of demodulating the radio frequency signal received by the antenna 101 and delivering the voice signal involved in the received radio frequency signal to the handset 113 while the data involved in the same to the data modem 103. Likewise, designated at 104 is a data communmication device (e.g., MSM82c51 available from Oki Electric Industry Co. Ltd.) serving to convert serial data transferred from the data modem 103 to parallel data to transmit it to a microprocessor 105 while converting the serial data provided from the microprocessor 105 to parallel data to transmit it to the data modem 103. Designated at 105 is the microprocessor for executing control in the radio phone equipment for a credit card, and 106 is a tone generator for delivering a dial tone and an intercept tone, etc., to the handset 113 with the help of the microprocessor 105, 107 is a data communication device (e.g., MSM82c51 available from Oki Electric Industry Co., Ltd.) serving to transform the credit card information read by a card reader 108 from serial data to parallel data and delivering it to the microprocessor 105. The data device 107 may be omitted when the imput data of the card reader is parallel data. Designated at 108 is the card reader for reading information recorded or stored in the credit card, and 109 is a clock circuit with a calender (e.g., capable of being constructed with a MSM6242RS type IC available from Oki Electric Industry Co., Ltd.). Likewise, designated at 110 is a battery back-up circuit for use in a power source to operate the clock circuit 109 with a calender without interruption even in a state of a power source for the equipment being interrupted, 111 is a key pad having a dialing function, 112 is a didsplay for dispalying states of the transmitter/receiver unit and guides for application for a user, 113 is a handset, and 114 is a hook switch being opened and closed due to on-hook and off-hook of the handsset 113. In addition, to set calendar/time data on the clock circuit with a calender 109, time data of year, month, day, hour, minute, and second at the present time is keyed in by means of the key pad 111.

Figure 2:
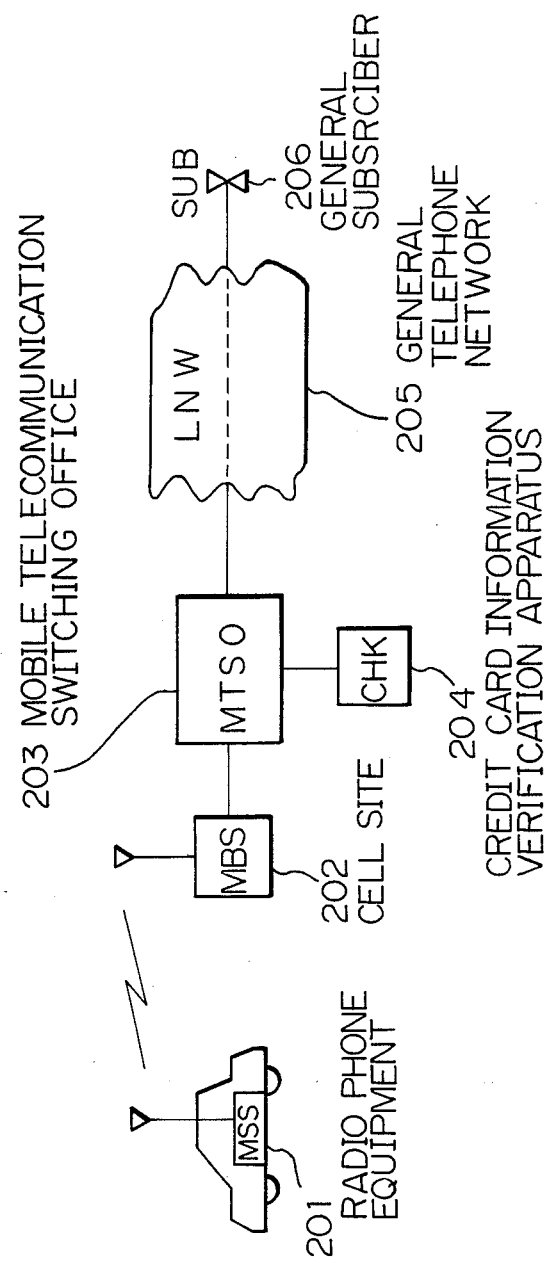
FIG. 2 is a view illustrating a trunking scheme of a mobile phone network including the radio phone equipment for a credit card.

As shown in FIG. 2 illustrating a repeating system in a mobile phone network, designated at 201 is the radio phone equipment (MSS) for credit card shown in FIG. 1, which is mounted on a mobile unit, 202 is a cell site (MBS) for communicating with the MSS 201 with use of a radio frequency, 203 is a mobile telecommunication switching office (MTSO) having a function to process charging information, and 204 is a credit card information verification apparatus (CHK) credit card.

Figure 3A:
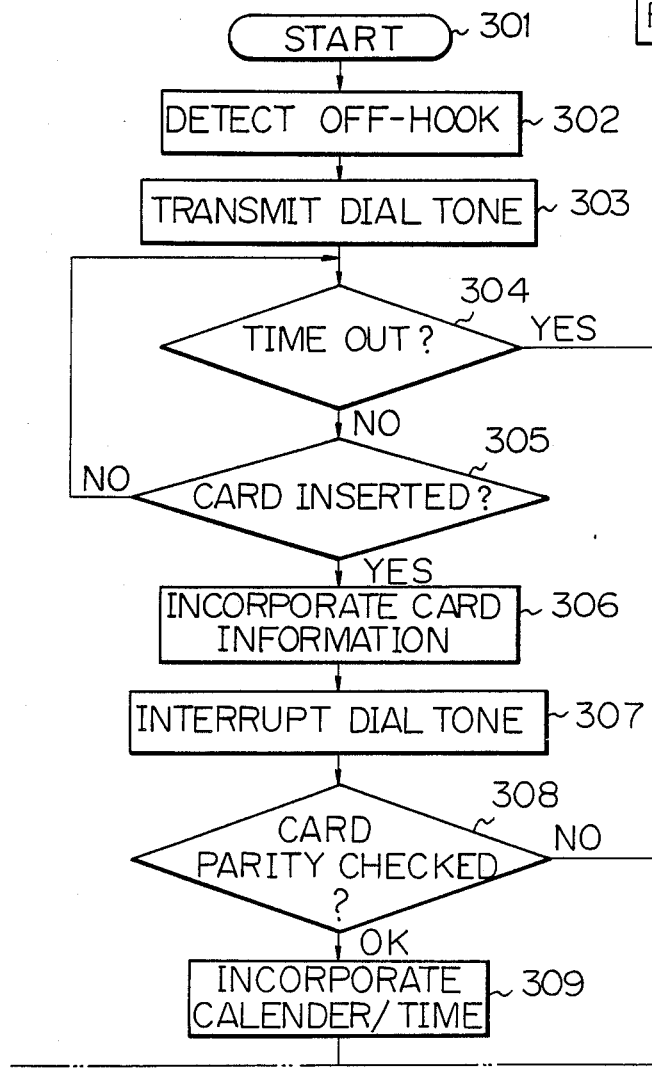
FIG. 3 consisting of FIGS. 3A-3C taken together, is a schematical flowcharts illustrating control in the radio phone equipment for a credit card.
Figure 3B:
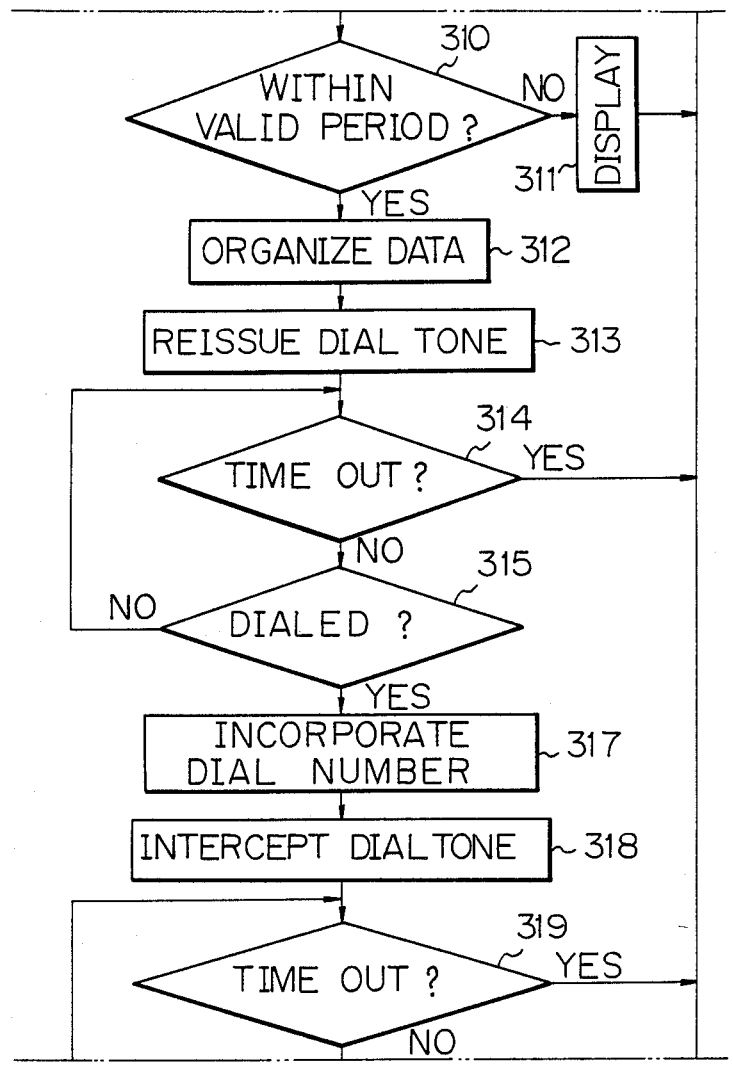
Figure 3C:
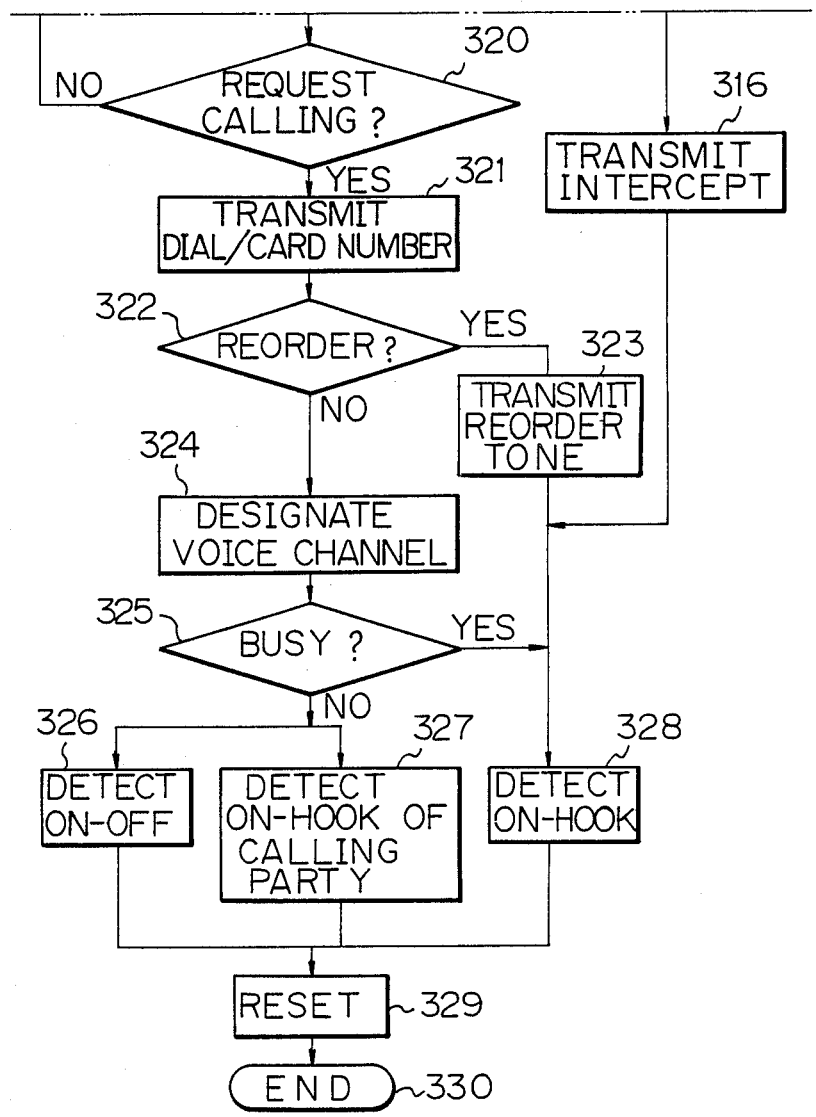
Figure 5:
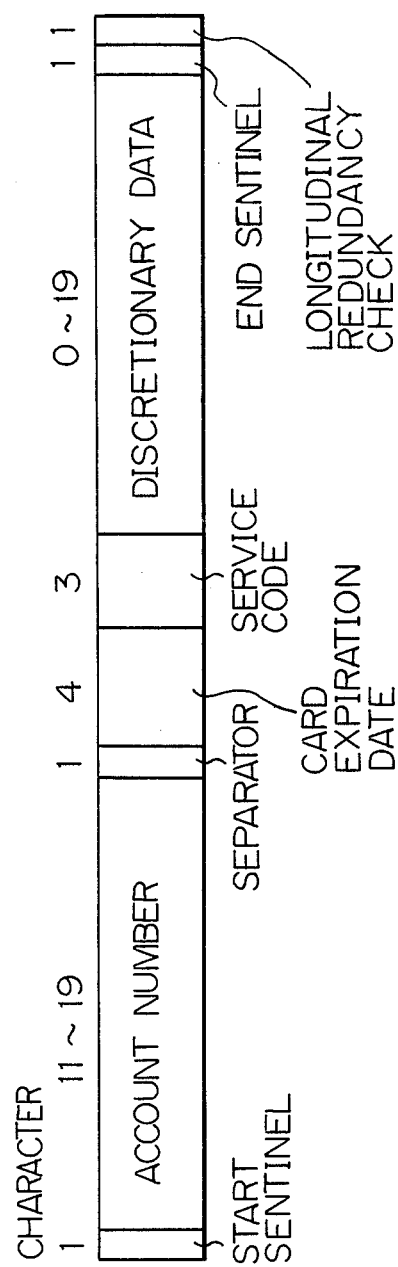
FIG. 5 is a view exemplarily illustrating a recording format of information recorded on a credit card.

Referring to FIG. 3, a schematical flow of control in the radio phone equipment for credit card 7 of FIG. 1 is shown. The control is mainly executed by the microprocessor 105 of FIG. 1.

In succession, operation of the radio phone equipment for credit card will be described with reference to FIGS. 1 to 3.

The radio phone equipment for credit card is powered, reset, and is ready to start (Step 301 of FIG. 3).

Lifted the hand set 113 shown in FIG. 1 by a user of the radio phone equipment for credit card, a contact of a hook switch 114 is closed and a control line 118 connected with the microprocessor 105 gets a ground level. The microprocessor 105 detects the ground level whereby judges the handset 113 to get a state of off-hook (FIG. 3, step 302). The microprocessor 105 instructs the tone generarantoar 106 to issue a dial tone (continuous sound of 697 Hz for example) (FIG. 3, step 303).

The dial tone issued from the tone generator 106 is provided to the hadset 113 via the signal line 117. The user listens to the dial tone with use of the handset 113 and knows a fact that it is possible to insert a credit card into the card reader 108.

The microprocessor 105 monitors whether or not the user has inserted the credit card into the card reader 108 within a predetermined period of time (e.g., within 20 seconds) after detecting the off-hook state of the handset 113 (FIG. 3, steps 304, 305). This monitoring is capable of executing by monitoring interruption from the card reader 108. The microprocessor 105 judges, unless the interruption from the card reader 108 is detected within the prescribed period, the off-hook state described above to have been caused by abnormal operation, and excecutes an intercept routine. Namely, the microprocessor 105 instructs the tone generator 106 to issue an intercept tone (e.g., to issue an alternate tone of 770 Hz and 1209 Hz every 240 ms). The tone generator 106 switches the dial tone to the intercept tone on the basis of the instruction and delivers it. The intercept tone reaches the handset 113 through the signal line 117 and prompts the user to on-hook the handset 113 (FIG. 31 step 316).

Inserted the credit card into the card reader 108 within the predetermined period of time by the user, the card reader 108 reads information carried by the credit card therefrom, and provides it to the data communication device 107 as serial data. The serial data is converted to paralleldata by the data communication device 107 and incorporated into the microprocessor 105 (FIG. 3, step 306). The data device 107 may be omitted when the imput data of the card reader is parallel data.

The microprocessor 105, after incorporating the parallel data, instructs the tone generatoar 106 to intercept the issue of the dial tone (FIG. 3, step 307), while executes a parity check on the data so incorporated (start sentinel, Access Number, Separator, Card Expiration date, Service Code, Discretionary data, End Sentinel, longitudinal redundancy check) (FIG. 3, step 308).

Provided the result of the parity check is abnormal, the microprocessor 105 judges that the credit card has not been inserted properly, and executes the intercept routine described before (FIG. 3, Step 316).

Provided the result of the parity check is normal, the microprocessor 105 temporarily stores the data in a RAM, and searches for a separator (DH) on the data and stores a card expiration date located behind the separator in a specific card expiration date area (address) on the RAM.

The microprocessor 105 accesses in succession a clock circuit with a calender (e.g., realizable with an IC of MSM 6242 RS available from Oki Electric Industry Co. Ltd.), reads present time/calender, and compares it with the card expiration date stored in the RAM whereby it judges whether or not the credit card is within a valid time limit (FIG. 3, Steps 309, 310).

Unless the credit card is within the valid time limit, the microprocessor 105 displays a message indicative of the credit card being out of the time limit on the display 112, and prompts the user to exchange the credit card for a new one while executes the intercept routine (FIG. 3, Steps 311, 316).

Provided the credit card is within the valid time limit, the microprocessor 105 extracts, if there is any portion to need format conversion in the credit card information stored in the RAM, that portion, transforms it into a format employed in transmitting that portion to a radio channel (FIG. 3, Step 312), and instructs the tone generator 106 to reissue the dial tone. The dial tone so issued is provided to the handset 113 via the signal line 117 to inform the user of a fact that a calling number can be dialed (FIG. 3, Step 313).

FIG. 4 exemplarily shows the format conversion described above.

The microprocessor 105 monitors whether or not the user has dialed within a predetermined period of time (e.g., 20 seconds) after the user inserted the credit card into the card reader 105. Unless the user depresses a key of the key pad 111 to key in the dial number, the microprocessor 105 successively executes the intercept routine described above (FIG. 3, Steps 314, 316). Keyed in the dial number within the time described before by the user, the microprocessor 105 successively scans columns/rows of the key pad 111 to know which key is depressed, and displays a number corresponding to the depressed key on the display 112, while instructs the tone generator 106 not to issue the dial tone (FIG. 3, Steps 317, 318). The user thus can confirm the number keyed in on the basis of the number displayed on the display 112.

Provided the user, after keying in a calling number, does not depress a send key provided on the key pad 111 within a predetermined period of time, the microprocessor 105 regards the dialing described above as being mistaken operation and hence executes the intercept routine (FIG. 3, Steps 319, 316).

Depressed the send key within the time described above by the user, the microprocessor 105 confirms the depress, edits the calling number described before, credit card data temporarily stored in the RAM, and information required for processings of calling connection and charging into a prescribed data format, and delivers them to the data communication device 104 in conformity with a prescribed procedure. The data communication device 104 transforms the received data to serial data and delivers it to the data modem 103. The data modem 103 subjects the serial data so obtained to a prescribed waveform processing (e.g., Manchester decoding or sub-carrier frequency conversion) and delivers it to the transmitter/receiver 102. The transmitter/receiver 102 then subjects the received signal to RF modulation on a designated RF channel as one of base band inputs, transmits it to the antenna 101 as a radio frequency signal (FIG. 3, Steps 320, 321), and waits for a signal from a cell.

The cell (MBS) 202 shown in FIG. 2 receives and demodulates the radio frequency signal transmitted as such, and subjects it to a prescribed processing, and thereafter transfers it to the mobile telecommunication switching office (MTSO) 203. The MTSO 203 extracts credit card information such as a primary access number from the received information and delivers the extracted information to a credit card information verification apparatus (CHK) 204. The CHK 204 checks validity of the above credit card based on the credit card information and provides a checked result, yes/no to the MTSO 203. The MTSO 203, in receiving the checked result, "yes", executes processings such as selection and capture of a radio voice channel, selection and capture of a trunk to a general telephone network (LNW) 205, and preparation of charging to the credit card, etc., and controls calling connection to a general subscriber SUB 206 corresponding to the calling number. The MTSO 203, upon receiving the checked result, "no", sends a reorder request to the cell (MBS) 202. The MTSO 203, thereupon, may selectively capture, instead of a trunk to the general telephone network (LNW) 205, a talkie trunk serving to inform the user of the credit card as being invalid, and may control the calling connection.

When the radio voice channel or the trunk of the MTSO 203 is busy, the reorder request is transmitted as a radio frequency signal from the MTSO 203 to the mobile phone 201 via the MBS 202. The transmitter/receiver 102 shown in FIG. 1 amplifies and demodulates the radio frequency signal so received by the antenna 101, and delivers a demodulated signal to the data modem 103 through the signal line 115. The data modem 103 extracts the data in concern (reorder request in this case) from the received signal and provides the data to the data communication device 104. The data communication device 104 transforms this data from serial data to parallel data and delivers it to the microprocessor 105. The microprocessor 105, after confirming the reorder request, instructs the tone generator 106 to issue a reorder tone (e.g., issues a dual tone of 770 Hz and 1209 Hz for 240 ms, and issues none for the next 240 ms). The reorder tone issued from the tone generator 106 reaches the handset 113 through the signal line 117, and prompts the user to recall (FIG. 3, Steps 322, 323).

Provided the radio voice channel and the trunk of the MTSO 203 are not busy, calling is normally connected, whereby a voice channel designation signal is transmitted back from the MTSO 203. The microprocessor 105, after receiving the voice channel designation signal, instructs the transmitter/receiver unit 102 through the control line 116 to set a transmitting/receiving frequency on the voice channel. The user at this time is made possible to talk with a called party and is capable of listening to a ring back tone or a busy tone with the called party through the handset 113.

In case of the called party being busy, the user put down the handset 113 whereby a contact of the hook switch 114 is opened (FIG. 3, Step 325). The microprocessor 105 detects the hook switch 114 as being opened via the control line 118 while thereby knowing the handset 113 to stay on the on-hook state (FIG. 3, Step 328), and hence clears the dial number and the credit card information stored in the RAM to return the control to an initial state (FIG. 3, Step 329). The called party brings about the handset to the off-hook, the user becomes ready for talking.

Finished the talking the user put down the handset 113 whereby the contact of the hook switch 114 is opened. The microprocessor thereupon executes the same processing as in the Steps 328, 329 described above and returns to the initial state (FIG. 3, Steps 326, 329).

When the called party on-hooks the handset before the user does the same, a release order signal is delivered from the mobile telecommunication switching office (MTSO 203 shown in FIG. 3) to the microprocessor 105 via the antenna 101, the transmitter/receiver 102, the data modem 103, and the data communication device 104. The microprocessor 105, after receiving this release order signal, clears all of the dial number and the credit card information stored in the RAM and returns to the initial state (FIG. 3, Steps 327, 329).

While, the mobile telecommunication switching office, when talking is performed between the user and the called party, stores charging information (calling party telephone number, called party telephone number, time of talk initiation/completement, and the like) in a magnetic tape or other memory means for each primary access number. In succession, information transfer of the credit card will be described.

In applying the present invention to the USA EIA Standard Mobile Phone System, a method is known to put the credit card information on upward control channel RECC.

Referring to FIG. 6, a data format of the upward control channel RECC in the USA EIA Standerd System is shown in part, which exemplarily illustrates information transfer of information involved in a credit card by making use of a word F and D1 through D16 of a word G. Namely, by making use of the word F and word G of FIG. 6 for example in conformity with the extended telephone number transfer format described in Section 4 of the EIA standard IS-3-b, a 16-figure decimal code can be transferred and hence the primary access number can be put on the code.

Likewise, another method is known to put credit card information on a voice channel RVC without relying upon the control channel RECC. This is also effected in conformity with an extended telephone number transfer format by making use of the upward voice channel RVC described in Section 4 of the EIA standard IS-3-B.

The information transfer format described above and a signal medium for information transfer were demonstrated as only an example. In addition, the information transfer format, described in a case of a mobile phone, can be applicable to radio phones for trains, vessels, and airplanes with ease. Applications to those of portable type are also likely, namely applications to extraordinary phones and lending phones, etc.

According to the radio phone equipment for credit card of the present invention, as described above, the following advantages can be assured:

(a) The radio phone equipment of the present invention can be freely utilized by many passengers without troubling carmans in a radio phone in automobiles as well as in airplanes, vessels, and trains. In addition, the equipment enables charges easily to be collected from users without fail.

(b) The equipment requires no function to transmit and receive a charging signal unlike prior public radio phones, and in addition circuitry thereof is simplified to prevent speech quality from being deteriorated.

(c) A user can do without cash such as any coin.

(d) The equipment requires no strong box and no periodical collection of charges unlike a case of a coin type, and can be miniaturized and made light-weight, and thus is applicable to portable lending phones or extraordinary phones.

Furthermore, the present radio phone equipment consists of a clock circuit with a calender, a credit card reader, and a control circuit, and is adapted to collate an output from clock circuit with a calender with time limit information available from the credit card reader to judge a valid time limit of the credit card, and adapted to disable itself when the time limit is out. Accordingly, the equipment can do without communication of requesting a parent station to judge the valid time limit and hence can do without capturing an invalid radio channel. Furthermore, the equipment can transfer credit card information while omitting a valid time limit, a service code, part or the whole of arbitrary data, whereby data transmission efficiency of the radio channel can be improved.

What is claimed is:

1. A radiotelephone system adapted to read a credit card for charging comprising:
    a means for inputting a credit card information signal stored on the credit card, which includes a card expiration date signal and a primary access number signal:
    a clock circuit means for generating a present date signal;
    a means for comprising said expiration date signal with said present date signal; and
    a means for transmitting said credit card information signal with said card expiration date signal deleted only if a date indicated by said present date signal is prior to or equal to a date indicated by said card expiration date signal.

2. A radiotelephone system according to claim 1, wherein a radio control data link is used for transmitting said credit card information signal.

3. A radiotelephone system according to claim 1, wherein said credit card information signal including at least said primary access number signal is transmitted over a voice channel.

4. A radiotelephone system according to claim 1, further including a visible indicating means or an audible indicating means for indicating said comparison effected by said comparing means.

* * * * *